Patented Feb. 3, 1953

2,627,506

UNITED STATES PATENT OFFICE 2,627,506

PREPARATION OF METAL OXIDE GEL CATALYSTS

Edward A. Hunter and Charles N. Kimberlin, Jr., Baton Rouge, La., assignors to Standard Oil Development Company, a corporation of Delaware No Drawing. Application May 7, 1949, Serial No. 92,072

11 Claims. (Cl. 252—463)

This invention pertains to the preparation of synthetic metal oxide gel catalysts and particularly to the preparation of metal oxide cogels which are free of silica.

It is, of course, well known to prepare synthetic silica-alumina gels of high activity for the catalytic conversion of hydrocarbon oils, particularly for cracking, by combining alumina or a salt convertible to alumina with a hydrous oxide of silicon, such as silica hydrosol, silica hydrogel or gelatinous precipitate of silica and mixtures thereof, in which the silica contains a substantial amount of imbibed water at the time of mixing the alumina or the aluminum salt solution therewith.

It has also been proposed to prepare synthetic metal oxide gel catalysts by preparing a silica-magnesia or silica alkaline earth metal oxide hydrogel, soaking said hydrogel with an aluminum or other catalytic metal salt solution under conditions to form the corresponding magnesium or alkaline earth metal salt, leaving an equivalent amount of aluminum or other catalytic metal within the silica hydrogel as a hydrous oxide whereupon the magnesium or alkaline earth metal salt is washed from the hydrogel and the latter is dried and activated. This is a very effective method for preparing silica-metal oxide cogels containing up to as high as 65% of one or more catalytic metal oxides.

It has now been found that oxides of a number of different metals may be prepared as hydrogels by the addition of magnesia to a suitable salt of the metal. In accordance with a preferred embodiment of the present invention, an excess of magnesia is added to the metal salt solution in order to provide controlled amounts of magnesia in the metal oxide hydrogel which may then be replaced by treating the magnesia-containing hydrogel with a salt of another metal which forms slightly soluble oxides and which metal is less basic than magnesium. Suitable metals include iron, cobalt, thorium, nickel, copper, chromium, beryllium, zirconium, aluminum, manganese, etc.

Metals, the oxides of which may be prepared as hydrogels by the addition of magnesia to a suitable salt in accordance with the present invention are beryllium, aluminum, titanium, zirconium, tin, thorium, chromium and iron. These metals are utilized in the form of their water soluble salts such as the chloride, sulfate, nitrate or, if desired, the formate or acetate. The metal salt solutions used are of such concentration that they set to a firm hydrogel upon reaction with the magnesia added.

The magnesia utilized to form the metal oxide hydrogel by reaction with the metal salt may be pure or it may be a commercial grade material. Magnesia prepared by calcining either magnesium carbonate or natural magnesite are especially useful. The magnesia may be added to the metal salt solution in dry form or as a slurry in water to facilitate its incorporation into the solution. In lieu of adding magnesia as such, it may be added as a hydrous oxide such as magnesia hydrate.

The amount of magnesia added to the metal salt solution is in excess of that necessary to precipitate the metal salt as a hydrous oxide. After the magnesia is added to the metal salt solution the mixture becomes warm due to reaction and in a short time becomes viscous and then sets to a rigid hydrogel. The time required for setting varies from one or two seconds to as much as 10 minutes. The time for setting depends upon (1) the temperature (2) the specific metal salt used, (3) the concentration of the metal salt and the amount of magnesia used, and (4) especially the activity of the particular magnesia used. Magnesias differ greatly in their activity; finely divided magnesias are more active than those of larger particle size, and the more highly calcined magnesias are less active than those which have been calcined to a lesser degree. One of the means of control in the present invention is to choose a magnesia which will give the most convenient setting time. In carrying out the operation it is desirable in order to get a homogeneous product to agitate the mixture after addition of the magnesia till the viscosity begins to increase, indicating incipient setting. The hydrogel which is obtained very much resembles silica hydrogel, though it is generally not so transparent. It occupies the entire volume of the solution from which it is formed. It is rigid and will vibrate when struck. It is rather hard, its hardness depending on the particular metal oxide and its concentration. When broken it gives a conchoidal fracture. Like most other hydrogels, after standing a time syneresis sets in with the squeezing out of the structure of water and the spontaneous development of fractures. The time required for syneresis, of course, depends upon the particular metal oxide involved, its concentration, and the temperature.

The amount of magnesia combined with the metal salt solution to form the corresponding metal oxide hydrogel impregnated with magnesia is varied in accordance with the amount of active metal oxide which is desired in the final catalyst. Ordinarily the magnesia will constitute from about 1 to about 50 weight percent (based on dry metal oxide plus dry magnesia) of the magnesia impregnated hydrogel. By providing such amounts of magnesia in the impregnated hydrogel from about 1 to as high as 60%, preferably about 5 to 30% (dry basis) of the active metal oxide may be incorporated by reacting the magnesia impregnated hydrogel with a metal salt solution. If a three component magnesia-containing catalyst is desired, sufficient magnesia in excess of that which reacts with the metal salt is provided to give the desired magnesia content in the final composition. In the event that more magnesia is desired in the hydrogel than can be conveniently incorporated during the precipitation of the original metal salts with magnesia, the resulting magnesia impregnated metal oxide hydrogel may have further amounts of magnesia incorporated as by mulling or passing the magnesia containing hydrogel and additional quantities of magnesia through a homogenizer or suitable colloid mill.

The magnesia impregnated hydrogel prepared in accordance with this invention may, if desired, be prepared in the form of spheres. For example, if large spherical particles or macrospheres are desired, the magnesia-impregnated salt solution prepared as described is formed into droplets which are suspended in a water-immiscible or partially water-miscible organic liquid and maintained therein until the droplets have set to firm spheres of hydrogel. If microspheres are desired, the magnesia-impregnated salt solution is dispersed in a water-immiscible or at most partially water-miscible organic liquid containing a dispersing agent which is maintained under vigorous agitation until the magnesia-impregnated salt solution has set to firm particles of hydrogel.

The magnesia impregnated hydrogel may be washed and/or dried before treatment with the salt solution in order to replace the magnesia therein or washing may be deferred until replacement of the magnesia has taken place. One preferred sequence of operations is (1) to treat the magnesia-impregnated hydrogel with the salt solution, (2) partially wash with water to remove most of the soluble salts, (3) dry, (4) treat with a second portion of salt solution to replace the final traces of magnesia, (5) re-wash, and (6) re-dry.

Replacement of magnesia may be accomplished by simply soaking the magnesia impregnated hydrogel in a solution of a suitable salt of the metal, the oxide of which it is desired to have deposited on or within the metal oxide base material. In general, the magnesia is replaced by metal oxides that are at most only slightly soluble. Moreover, metals the oxides of which are incorporated in the catalyst composition by reaction with the magnesia are characterized by being less basic than magnesium and are contained in groups II, III, IV, VI, VII and VIII of the periodic table and include such metals as iron, cobalt, thorium, nickel, copper, chromium, beryllium, zirconium, uranium, zinc, aluminum, manganese or the like. Any salt of these metals may be used which is characterized by the fact that the salt will react with magnesia to form the corresponding magnesium salt while the metal is precipitated in the hydrogel as the hydrous oxide. Suitable salts of the above mentioned metals are the sulfates, the halides, preferably the chlorides and the nitrates. Salts of two or more metals with the same or different acids may be used if multi-component compositions are desired.

The replacement of the magnesia or a part of the magnesia contained in the magnesia-impregnated metal oxide hydrogel can be effected by soaking or impregnating with solutions of salts of the above mentioned metals of such concentration that the volume of the solution to contain the required amount of salt will completely cover the hydrogel, which should be broken up into lumps for this treatment. This replacement is preferably conducted at or about room temperature although elevated temperatures and pressures may be employed if desired.

The following examples are illustrative of the present invention.

Example 1

An $Al_2O_3$ hydrogel was prepared by adding a slurry of 900 g. of a fairly inactive commercial magnesia in 2500 cc. water to 7.540 liters $Al(NO_3)_3$ solution, sp. gr. 1.39. After several minutes agitation the mixture sets to an alumina hydrogel containing a minor amount of magnesia. This hydrogel was aged over night and then granulated.

The granulated hydrogel was soaked for about 60 hours in a solution containing sufficient $Cr(NO_3)_3.9H_2O$ to replace the magnesia in the hydrogel with $Cr_2O_3$. The volume of the solution was adjusted to just cover the granulated hydrogel.

The catalyst was then washed and dried. It contained about 5% $Cr_2O_3$ on $Al_2O_3$. This composition is useful as a catalyst in the reforming of naphthas.

Example 2

16.5 g. of a moderately active commercial MgO were slurried with 40 cc. $H_2O$ and added with vigorous agitation to 100 cc. 2 molar $Cr(NO_3)_2$.

Mixture sets to a grey-green true hydrogel in about 1 minute 45 seconds.

The hydrogel is broken up and soaked over night in a solution containing 120% of the stoichiometric $Cu(NO_3)_2$ required to react with the MgO in the hydrogel.

$Cr_2O_3$-$CuO$ hydrogel washed free of $Mg(NO_3)_2$ by decantation and dried. The composition contained 20% CuO on $Cr_2O_3$. This composition is useful for the dehydrogenation of hydrocarbons.

Example 3

16.2 g. of a moderately active commercial magnesia were slurried with 60 cc. $H_2O$ and added with agitation to 100 cc. $Al_2(SO_4)_3$ solution, sp. g. 1.31.

Mixture sets to a true hydrogel in about 1 minute 30 seconds.

The hydrogel is broken up and is soaked over night in a solution containing 120% of the stoichiometric $Be(NO_3)_2$ required to react with the MgO in the hydrogel.

$BeO$-$Al_2O_3$ hydrogel is washed by decantation and dried. The composition contained about 10% BeO on $Al_2O_3$. This composition is useful for the dehydration of alcohols to form olefins.

Example 4

120 g. titanyl sulfate solution, 5.26% $TiO_2$ and 9.5% total acidity as $H_2SO_4$, is agitated and has added to it a slurry of 5.38 g. of a moderately active commercial MgO in 35 cc. $H_2O$.

Mixture sets to a true hydrogel in 50 seconds. The hydrogel broken up and is soaked over night in a solution containing 120% of the stoichiometric $Al_2(SO_4)_3$ required to react with the free MgO in the hydrogel.

The $Al_2O_3$-$TiO_2$ hydrogel is washed by decantation and is dried. The composition contained about 10% $Al_2O_3$ on $TiO_2$. This composition is useful for cracking petroleum oils.

*Example 5*

39.3 g. $ZrOCl_2$ is dissolved up to 100 cc. with distilled water. To this is added with agitation a slurry of 7.5 g. of a moderately active commercial MgO in 35 cc. $H_2O$.

The mixture sets to a true hydrogel in 15 seconds.

The hydrogel is broken up and soaked over night in a solution containing 120% of the stoichiometric $Be(NO_3)_2$ required to react with the free MgO in the hydrogel.

The $BeO$-$ZrO_2$ hydrogel is washed by decantation and is dried. This composition contains about 10% BeO on $ZrO_2$. This composition is useful for cracking petroleum oils.

The foregoing specification contains a limited number of embodiments of the present invention. It will be understood, however, that numerous variations are possible without departing from the scope of the following claims.

What is claimed and desired to be secured by Letters Patent is:

1. A method of preparing metal oxide cogels which comprises reacting a salt of a polyvalent metal selected from the group consisting of beryllium, aluminum, titanium, zirconium, tin, thorium, chromium and iron with an excess of magnesia in order to form the corresponding metal oxide hydrogel containing unreacted excess magnesia dispersed therein, soaking the magnesia-containing hydrogel with a solution of a salt of a metal less basic than magnesium and selected from the group consisting of copper and the metals contained in groups II, III, IV, VI, VII and VIII of the periodic table thereby forming the corresponding magnesium salt and precipitating an equivalent amount of said metal within the hydrogel as a hydrous oxide, washing out the magnesium salt, drying and calcining the hydrogel.

2. A method of preparing metal oxide cogels which comprises reacting a salt of a polyvalent metal selected from the group consisting of beryllium, aluminum, titanium, zirconium, tin, thorium, chromium and iron with an excess of magnesia in order to form the corresponding metal oxide hydrogel containing unreacted excess magnesia dispersed therein, soaking the magnesia-containing hydrogel with a solution of a salt of chromium thereby forming the corresponding magnesium salt and precipitating an equivalent amount of chromium within the hydrogel as a hydrous oxide, washing out the magnesium salt, drying and calcining the hydrogel.

3. A method of preparing metal oxide cogels which comprises reacting a salt of a polyvalent metal selected from the group consisting of beryllium, aluminum, titanium, zirconium, tin, thorium, chromium and iron with an excess of magnesia in order to form the corresponding metal oxide hydrogel containing unreacted excess magnesia dispersed therein, soaking the magnesia-containing hydrogel with a solution of a salt of copper thereby forming the corresponding magnesium salt and precipitating an equivalent amount of copper within the hydrogel as a hydrous oxide, washing out the magnesium salt, drying and calcining the hydrogel.

4. A method of preparing metal oxide cogels which comprises reacting a salt of a polyvalent metal selected from the group consisting of beryllium, aluminum, titanium, zirconium, tin, thorium, chromium and iron with an excess of magnesia in order to form the corresponding metal oxide hydrogel containing unreacted excess magnesia dispersed therein, soaking the magnesia-containing hydrogel with a solution of a salt of beryllium thereby forming the corresponding magnesium salt and precipitating an equivalent amount of beryllium within the hydrogel as a hydrous oxide, washing out the magnesium salt, drying and calcining the hydrogel.

5. A method of preparing metal oxide cogels which comprises reacting a water soluble salt of aluminum with an excess of magnesia in order to form an alumina hydrogel containing unreacted excess magnesia dispersed therein, soaking the magnesia-containing alumina hydrogel with a solution of a salt of a metal less basic than magnesium and selected from the group consisting of copper and the metals contained in groups II, III, IV, VI, VII and VIII of the periodic table thereby forming the corresponding magnesium salt and precipitating an equivalent amount of said metal within said alumina hydrogel as a hydrous oxide, washing out the magnesium salt, drying and calcining the hydrogel.

6. A method of preparing metal oxide cogels which comprises reacting a water soluble salt of aluminum with an excess of magnesia in order to form an alumina hydrogel containing unreacted excess magnesia dispersed therein, soaking the magnesia-containing alumina hydrogel with a solution of a salt of chromium thereby forming the corresponding magnesium salt and precipitating an equivalent amount of chromium within said alumina hydrogel as a hydrous oxide, washing out the magnesium salt, drying, and calcining the hydrogel.

7. A method of preparing metal oxide cogels which comprises reacting a water soluble salt of aluminum with an excess of magnesia in order to form an alumina hydrogel containing unreacted excess magnesia dispersed therein, soaking the magnesia-containing alumina hydrogel with a solution of a salt of beryllium thereby forming the corresponding magnesium salt and precipitating an equivalent amount of beryllium within said alumina hydrogel as a hydrous oxide, washing out the magnesium salt, drying and calcining the hydrogel.

8. A method of preparing metal oxide cogels which comprises reacting a water soluble salt of chromium with an excess of magnesia in order to form a chromia hydrogel containing unreacted excess magnesia dispersed therein, soaking the magnesia containing chromia hydrogel with a solution of a salt of a metal less basic than magnesium and selected from the group consisting of copper and the metals contained in groups II, III, IV, VI, VII and VIII of the periodic table thereby forming the corresponding magnesium salt and precipitating an equivalent amount of said metal within said chromia hydrogel as a hydrous oxide, washing out the magnesium salt, drying and calcining the hydrogel.

9. A method of preparing metal oxide cogels which comprises reacting a water soluble salt of aluminum with an excess of magnesia in order to form an alumina hydrogel containing unreacted excess magnesia dispersed therein, soaking the magnesia-containing alumina hydrogel with a solution of a salt of copper thereby forming the corresponding magnesium salt and precipitating an equivalent amount of copper within said alumina hydrogel as a hydrous oxide, washing out the magnesium salt, drying and calcining the hydrogel.

10. A method of preparing metal oxide cogels according to claim 1 in which the metal less basic than magnesium is cobalt.

11. A method of preparing metal oxide cogels according to claim 1 in which the metal less basic than magnesium is titanium.

EDWARD A. HUNTER.
CHARLES N. KIMBERLIN, Jr.

REFERENCES CITED

The following references are of record in the file of this patent:

UNITED STATES PATENTS

| Number | Name | Date |
|---|---|---|
| 2,342,247 | Burk | Feb. 22, 1944 |
| 2,369,734 | Heard | Feb. 20, 1945 |
| 2,435,379 | Archibald | Feb. 3, 1948 |
| 2,445,345 | Byrns | July 20, 1948 |
| 2,450,394 | Brown et al. | Feb. 28, 1948 |
| 2,472,831 | Hunter | June 14, 1949 |